United States Patent [19]

Bonhomme

[11] Patent Number: 4,546,228
[45] Date of Patent: Oct. 8, 1985

[54] APPARATUS FOR WELDING CONNECTIONS OF COMPONENTS

[75] Inventor: Bernard Bonhomme, Messigny et Vantoux, France

[73] Assignee: L.C.C.-C.I.C.E. Compagnie Europeenne de Composants Electroniques, Paris, France

[21] Appl. No.: 559,413

[22] Filed: Dec. 8, 1983

[30] Foreign Application Priority Data

Dec. 15, 1982 [FR] France ................................ 8221042

[51] Int. Cl.⁴ ............................................... B23K 1/08
[52] U.S. Cl. ................................ 219/85 R; 219/85 F; 228/37
[58] Field of Search ............... 219/85 R, 85 E, 85 G, 219/85 F, 85 M, 338; 228/37, 56 A

[56] References Cited

U.S. PATENT DOCUMENTS

| 1,124,566 | 1/1915 | Wescott | 219/388 X |
| 1,671,300 | 5/1928 | MacDonald | 219/388 |
| 3,648,915 | 3/1972 | Leibfried et al. | 228/37 |

Primary Examiner—Roy N. Envall, Jr.
Assistant Examiner—Catherine M. Sigda

[57] ABSTRACT

An apparatus for welding connections of components, comprising a heating tube having an opening over the entire length of its upper generating line and having in its lower part a notch; a welding device disposed in the notch; and a device for advancing along the heating tube components mechanically held by conductive elements for forming the connections after welding. The heating tube is supplied by a low voltage generator.

15 Claims, 6 Drawing Figures

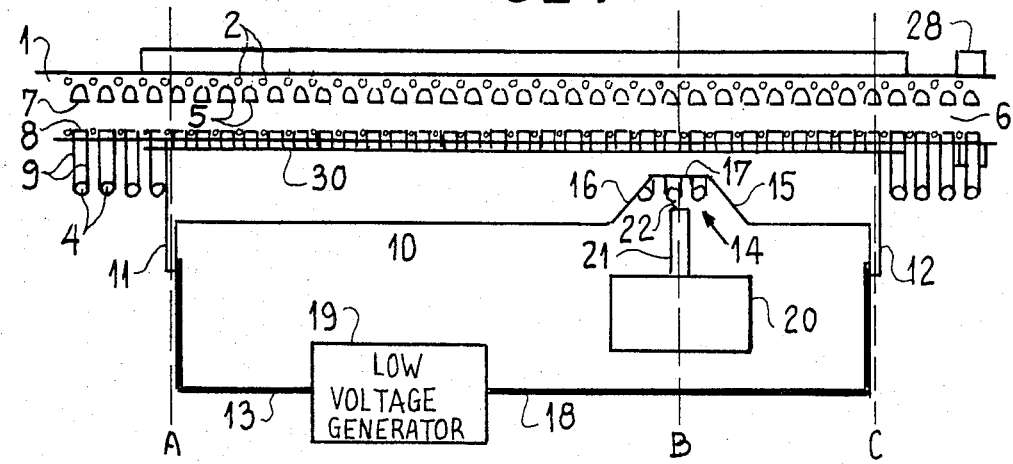
FIG_1
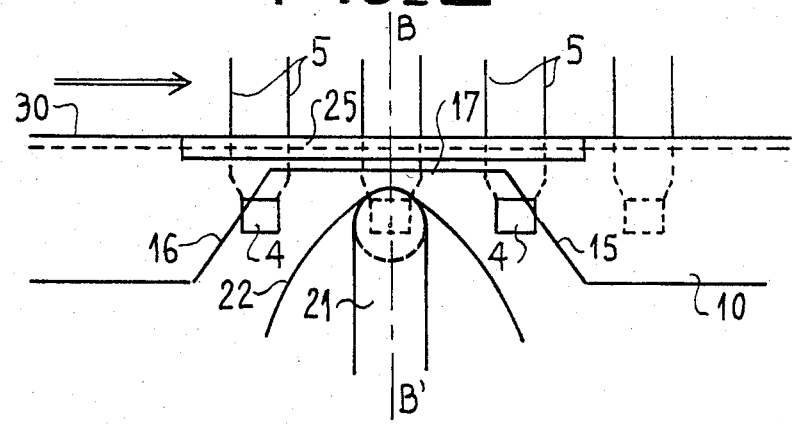
FIG_2
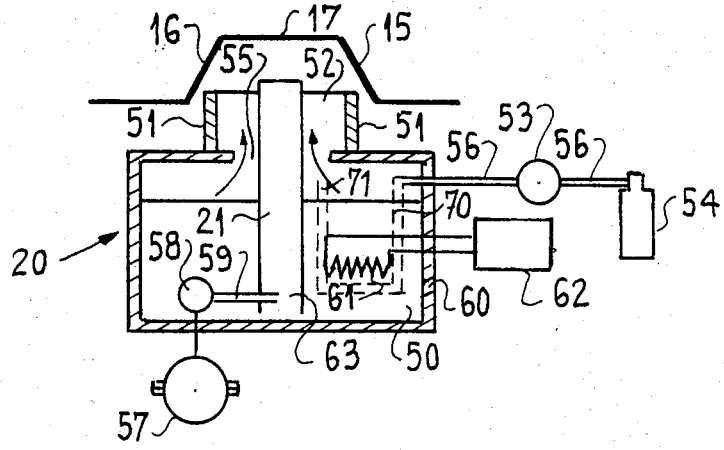
FIG_5

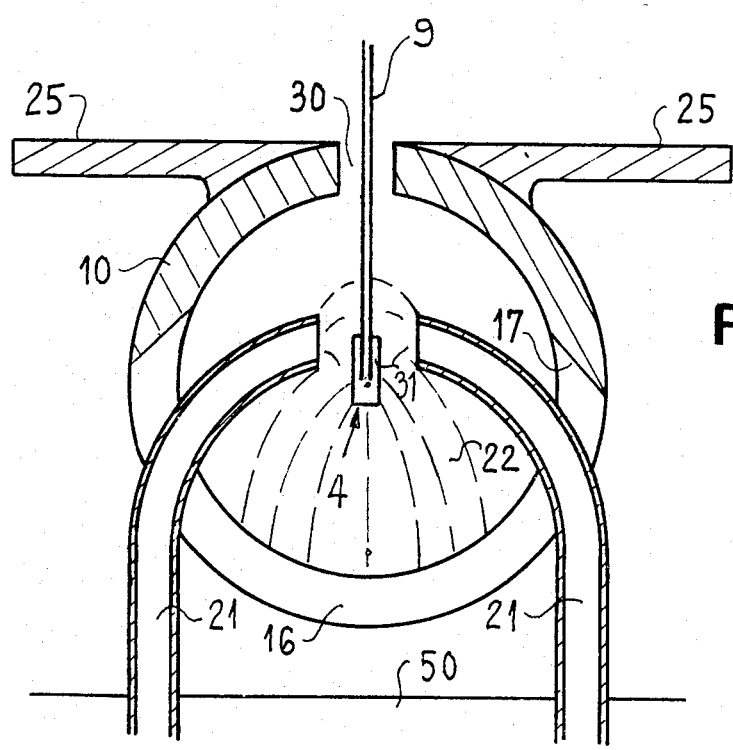
FIG_3·a
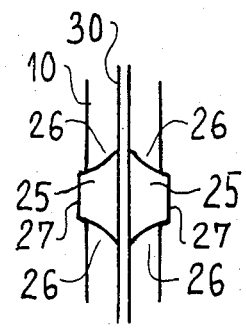
FIG_3·b
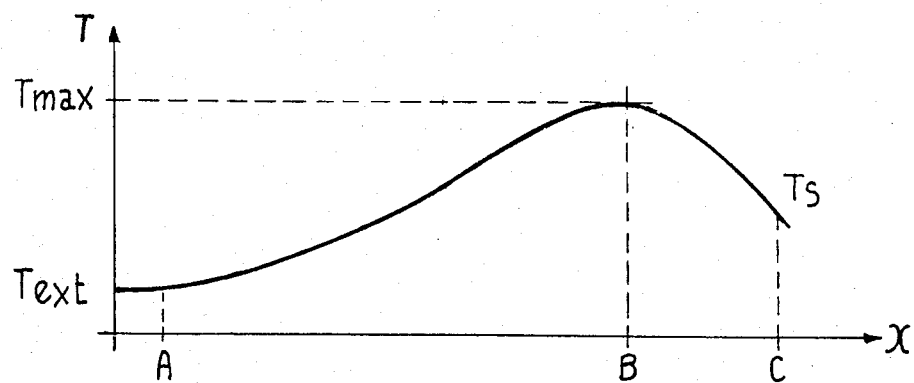
FIG_4

APPARATUS FOR WELDING CONNECTIONS OF COMPONENTS

FIELD OF THE INVENTION

The present invention relates to an apparatus for welding connections of components which incorporates a device for preheating the latter.

DESCRIPTION OF THE PRIOR ART

The prior art discloses procedures for welding the connections of components involving the use of tempering in a flux bath, followed by tempering in a solder pool of components, previously placed on a strip. This tempering operation may optionally be preceded by a preheating of the components, which is carried out in an oven, as close as possible to the solder pool. Even in the best possible case, the removal of the components from the oven and their transfer to the solder pool and, following welding, cooling by contacting with the external air, constitutes two thermal shocks liable to prejudice the quality of the components. Thus, for example, cracks appear in multilayer capacitors.

SUMMARY OF THE INVENTION

The invention relates to an apparatus for the welding of the connections of components, particularly ceramic capacitors, which incorporates a device for preheating the same and which prevents harmful heat shocks.

Thus, it is characterized in that it comprises a heating tube constituting the preheating device and an opening over the entire length of its upper generatrix and also having at a given point of its lower part a notch, and in that it also comprises a welding station arranged in said notch, together with a device for moving along the heating tube the components mechanically held by conductive elements, which form the connections after welding.

The heating tube can be an electrically conductive tube, particularly a cylindrical tube of revolution whose ends are connected to an electric power supply, which can be a high intensity, low voltage generator.

According to a preferred embodiment, the heating tube has in the area of the notch, at least one electrically conductive bridge compensating in cross-section, the notch formed in the lower part of the tube, so as to prevent overheating at this point. The bridge can be constituted by two ribs or flanges, laterally welded to each of the edges of the groove of the heating tube. The notch can be constituted by a cut having a trapezoidal profile.

The welding station is preferably constituted by a solder fountain. It can also have two solder supply pipes, opening out in front of one another on the path of the passage of the components, particularly through an opening of a solder tank.

The apparatus according to the invention advantageously comprises a device for circulating a neutral gas around the solder supply pipe in order to prevent oxidation of the solder.

According to a first variant, the neutral gas circulation takes place in a pressurized feed intake above the level of the solder pool, so as to preheat said gas. According to a second variant, the neutral gas is circulated by a pressurized, neutral gas supply intake extended by a tube section plunging into the solder pool, the latter being terminated by a discharge channel directing the gas, preheated during its passage in the tube plunging into the solder pool, towards said solder supply pipe.

According to a preferred embodiment, walls channel the neutral gas around the pipes towards the interior of the heating tube, so as to ensure a scavenging thereof by the preheated gas.

For a given type of component, the speed of advance can be such that it ensures a temperature rise of the component until it roughly reaches the temperature of the solder level with the notch. For example, the notch can be at 4/5 of the heating tube length.

BRIEF DESCRIPTION OF THE DRAWINGS

The invention is described in greater detail hereinafter relative to a non-limitative embodiment and with reference to the attached drawings, wherein show:

FIG. 1 a side view of an apparatus according to the invention.

FIG. 2 in side view a detail of FIG. 1 showing an embodiment of a heating tube according to the invention at its notch.

FIG. 3a a section along BB' of FIG. 2.

FIG. 3b in plan view a portion of the heating tube according to the invention, showing the tube flanges constituting a bridge at the heating tube notch.

FIG. 4 a dynamic temperature curve of the components along the length of the tube.

FIG. 5 in cross-section, a solder fountain with neutral gas circulation according to an embodiment of the invention.

DESCRIPTION OF THE PREFERRED EMBODIMENT

According to FIG. 1, a support strip 1 carrying the connections 5 is provided with a plurality of slot pairs, respectively upper slots 7 and lower slots 8, into which slide the hairpin-shaped connections 5. Components 4 are fixed between the two arms 9 of connections 5 and substantially at the end thereof. The two arms 9 of connection 5 are interconnected to form a hairpin and mutually exert on one another a reaction, which brings about a gripping of component 4, e.g. a capacitor. These hairpins are designed in such a way that their arms maintain a sufficient application force on the lateral electrical connections of the component to prevent the paving block formed by it from being disengaged in the arms before the welding operation. It is advantageously possible to use hairpin-shaped connections of the type described in French patent application No. 81 09 231, filed on May 8, 1981 by the Applicant Company and entitled "HAIRPIN-SHAPED CONNECTION FOR AN ELECTRICAL COMPONENT, PROVIDED WITH TWO CONTACT AREAS AND ITS USE FOR THE CONNECTION OF SAID COMPONENT".

Moreover, the slots 7 and 8 of the support strip 1 can be advantageously realized in such a way that the upper slot 7 is wider than the lower slot 8, so that after the hairpin-shaped member has been introduced with the bottom of the U on the side of the upper slot 7, the penetration of the arms into the upper and lower slots brings about the progressive tightening or locking thereof. Such a support strip is described in French patent application No. 81 09 230, filed on May 8, 1981 by the Applicant Comapny and entitled: "SUPPORT STIP FOR CONNECTIONS FOR CAPACITOR, STRIP PROVIDED WITH SUCH CONNECTIONS

AND ITS USE IN THE MANUFACTURE OF CAPACITORS".

The support strip 1 also carries two rows of holes 2, placed between the hairpins of connections 5 and which serves to permit the movement of support strip 1 by per se known means 28. A tube 10 is arranged along the displacement axis of the support strip 1 and has in its upper part an opening 30 extending over the entire length of the upper generating line of the tube in such a way as to enable the ends of arms 9 of hairpin 5, projecting beyond the lower part of the support strip 1, to enter the tube 10. At its ends, tube 10 has electrical connection clips 11, 12, connected to a low voltage generator 19 by electrical connections 13, 18, dimensioned so as to withstand high intensities. Tube 10 serves to ensure the preheating of the components 4 in order to weld the same, by raising them to a temperature which is as close as possible to that of the solder. For example, in the case of solder with a high solidus (e.g. lead-rich solders), the solder temperature can be approximately 350° C., i.e. 30° to 40° C. above the liquidus temperature (this temperature is 316° C. for a eutectic composition containing 97.5% lead, 0.75% tin and 1.75% silver). Under these conditions, the dissipated power is approximately 700 to 1000 watts for a stainless steel tube of diameter 50 mm and length approximately 1 m. As the resistivity of stainless steel is low, the ohmic resistance of the heating tube is also low, which leads to relatively high current intensities for low supply voltages.

Towards its downstream part, heating tube 10 has a trapezoidal notch 14 having an upper edge 17, bordered by two lateral flanges 15, 16. This notch contains a welding fountain 20, which sprinkles components 4 passing at the level of the notch by means of two tubes 21 spraying or projecting the solder 22. The welding or solder fountain 20 is of a conventional type and comprises (cf. FIG. 5) a solder pool 50 and a supply turbine 58, which ensures the projection of the solder by tubes 21. According to a particularly advantageous construction, a ventilation means 53, 54, 56 sucks a neutral gas, e.g. the most easily available gas nitrogen, and passes it into a tube plunging into the solder pool, so as to heat it to a temperature close to that of the solder. This hot gas is then blown into the tube 10, so as to produce a fluid circulation permitting a greater temperature uniformity in the tube level with notch 14, while ensuring that the solder projected or sprayed by fountain 20 does not come into contact with the oxygen of the air. Thus, if a contact did take place, it would be frequently necessary to clean the solder tank 60 of solder fountain 20, in view of the oxidation which progressively occurs.

FIGS. 2, 3a and 3b also show the conductor bridges constituted by two ribs or flanges 25, laterally welded to each of the edges of opening 30 of heating tube 10. The function of these bridges is to compensate in cross-section the machined part of the tube in the area of notch 14, so as to prevent overheating at this point, whilst maintaining a regular temperature profile. Thus, the bridges are formed in such a way that the electrical cross-section of tube 10 is kept constant at all points inside and outside the notch.

Such a profile is shown in plan view in FIG. 3b, in which the flanges 25 have in each case two profiled regions 26, narrowing towards the outside up to a flat top 27, corresponding to top 17 of notch 14.

FIG. 3a also shows how the components 4 are sprinkled by solder 22 via tubes 21, which are curved in such a way as to face one another and they project the solder 22 along two substantially horizontal axes slightly above the level of component 4. The solder then adheres by capillarity level with the conducting clip 9 in contact with the conducting terminations 31 of component 4 and the excess solder drops back again into the welding pool 50. It should also be noted, that as is known, components 4 are subject to the action of a standard flux bath for facilitating welding, prior to introduction into the heating tube 10.

FIG. 4 shows, with the tube length on the abscissa, the temperature curve to which the components are exposed during their displacement. At the entry of the tube at A, the components are at the external temperature $T_{ext}$. The displacement speed is chosen in such a way that the maximum temperature $T_{max}$ reached by the latter is obtained in the center of notch 14 (point B) and the heating is such that this temperature corresponds to a temperature slightly below that of the solder 22 when it leaves tubes 21. Downstream of notch 14, the temperature of components 4 progressively drops again, due to the influence of the downstream end of heating tube 10 at point C, which provides the influence of the external temperature, reduces the effectiveness of heating. In practice, the notch is advantageously positioned at 4/5 of the heating tube length, i.e. 80% of the tube length is used for the progressive heating of the components.

For a given heating power, the larger the components, the lower the passage speed thereof. For given components, an increase in the heating power of heating tube 10 makes it possible to increase the passage speed of the components. In practice, a speed corresponding to the processing of 60 to 80 components per minute is adopted.

According to FIG. 5, the solder fountain 20 has a tank 60 filled up to a given level with liquid solder 50, whose temperature is maintained by a heating device incorporating an electrical resistor 61 immersed in the solder and which is supplied by a regulating device 62. The lower ends 63 of tubes 21 are immersed in the solder and solder circulation is ensured by a turbine 58 immersed in solder 50 and driven by a motor 57, positioned outside tank 60. Turbine 58 delivers the liquid solder 50 by two delivery pipes 59, each issuing at the lower end 63 of a tube 21. A neutral gas circulation is ensured above the surface of solder 50 by means of a compressed nitrogen cylinder 54, a regulating valve 53 and pipes 56, which issue into the upper part of tank 60 above the level of solder 50. At one of its longitudinal ends, tank 60 has an opening 55, which permits the passage of tube 21 and the circulation of nitrogen around them. Pipe 56 issues at the other longitudinal end of tank 60, to enable the circulating nitrogen to reach opening 55 at a temperature relatively close to that of the solder pool 50. This temperature regulation is facilitated by the fact that it is only necessary to have a relatively limited nitrogen flow. According to a preferred variant, tube 56 is extended by a tube section 70, which is immersed in the solder and which is extended by a discharge channel 71, which is preferably positioned in the vicinity of opening 55 and which directs towards the latter the gas heated by the solder pool during its circulation in coil 70. Opening 55 is bordered by longitudinal wall 51 and lateral wall 52, whereof the upper part issues into the lower part of notch 14, so as to facilitate the circulation of nitrogen by reducing leaks to the outside of heating tube 10. Since, as was stated hereinbefore, the components are immersed in a flux bath before entering heating tube 10, the circulation of nitrogen through the latter also serves to entrain flux vapors which are produced during the temperature rise of component 4 in heating tube 10.

It should also be noted that the circulation of neutral gas through the heating tube only leads to a negligible heat supply. Thus, the heating of the components mainly takes place by heat radiation emitted by the hot walls of tube 10. Moreover, the use of a cylindrical tube 10 of revolution is particularly advantageous in that it permits a concentration of the heat flux emitted by the walls on the components, which will then be located close to the tube axis for maximum efficiency.

The invention is not limited to the described and represented embodiments. In particular it is suitable for the welding of connections of all types of components, which can be raised to a temperature close to that of the solder pool. Moreover, tube 10, which can have a random cross-section, can be thermally insulated from the outside and/or can be heated by means other than those described.

Moreover, the invention has been described in the case of a continuously performed welding process. However, it is obvious that the components can be brought into the tube in a discontinuous manner and can e.g. be placed on strips, which are themselves positioned on carriages or trolleys driven at a constant or variable forward speed and which are suitable for ensuring that the components undergo a temperature rise and cooling without any thermal shocks.

What is claimed is:

1. An apparatus for welding connections and components, comprising: an electrically conducting heating tube having ends connected to an electric power supply, for preheating the connections and components, an opening over the entire length of an upper generating line of the tube and also having at a given point of a lower part of the tube a notch, a welding station arranged in said notch, together with a device for moving along the heating tube the components mechanically held by conductive elements, which form the connections after welding, said heating tube in the area of said notch having at least one electrically conductive bridge, which compensates in cross-section the notch, to prevent overheating at said point.

2. An apparatus according to claim 1, wherein the heating tube is a cylinder of revolution.

3. An apparatus according to claim 1, wherein the electric power supply is a high intensity, low voltage generator.

4. An apparatus according to claim 1, wherein the bridge is constituted by two conductive ribs or flanges, laterally welded to each of the edges of the opening of the heating tube.

5. An apparatus according to claim 1, wherein the notch is constituted by a trapezoidal cut.

6. An apparatus according to claim 1, wherein the welding station is constituted by a solder fountain.

7. An apparatus according to claim 1, wherein the solder fountain has two solder supply pipes which are immersed in a solder pool of a solder tank and open out in front of one another onto the components.

8. An apparatus according to claim 7, wherein the two solder supply pipes open out facing one another through an opening in the solder tank.

9. An apparatus according to claim 7, comprising a device for circulating a neutral gas around the solder supply pipe so as to prevent oxidation of the solder.

10. An apparatus according to claim 9, wherein the device for circulating a neutral gas comprises a pressurized neutral gas feed intake above the solder pool, so as to preheat said gas.

11. An apparatus according to claim 9, wherein the device for circulating a neutral gas comprises a pressurized neutral gas feed intake extended by a tube section immersed in the solder pool and a discharge channel directing the preheated gas during its passage in the tube section immersed in the solder pool, towards said solder supply pipe.

12. An apparatus according to claim 10, comprising walls channelling the neutral gas flow around the pipes towards the interior of the heating tube, so as to ensure the latter is scavenged by the preheated gas.

13. An apparatus according to claim 1, wherein said moving device moves the component at such a speed that the component approximately reaches the temperature of the solder at said notch.

14. An apparatus according to claim 13, wherein the notch is located at 4/5 of the heating tube length.

15. An apparatus according to claim 1, wherein the components are ceramic capacitors.

* * * * *